United States Patent Office 3,517,979
Patented June 30, 1970

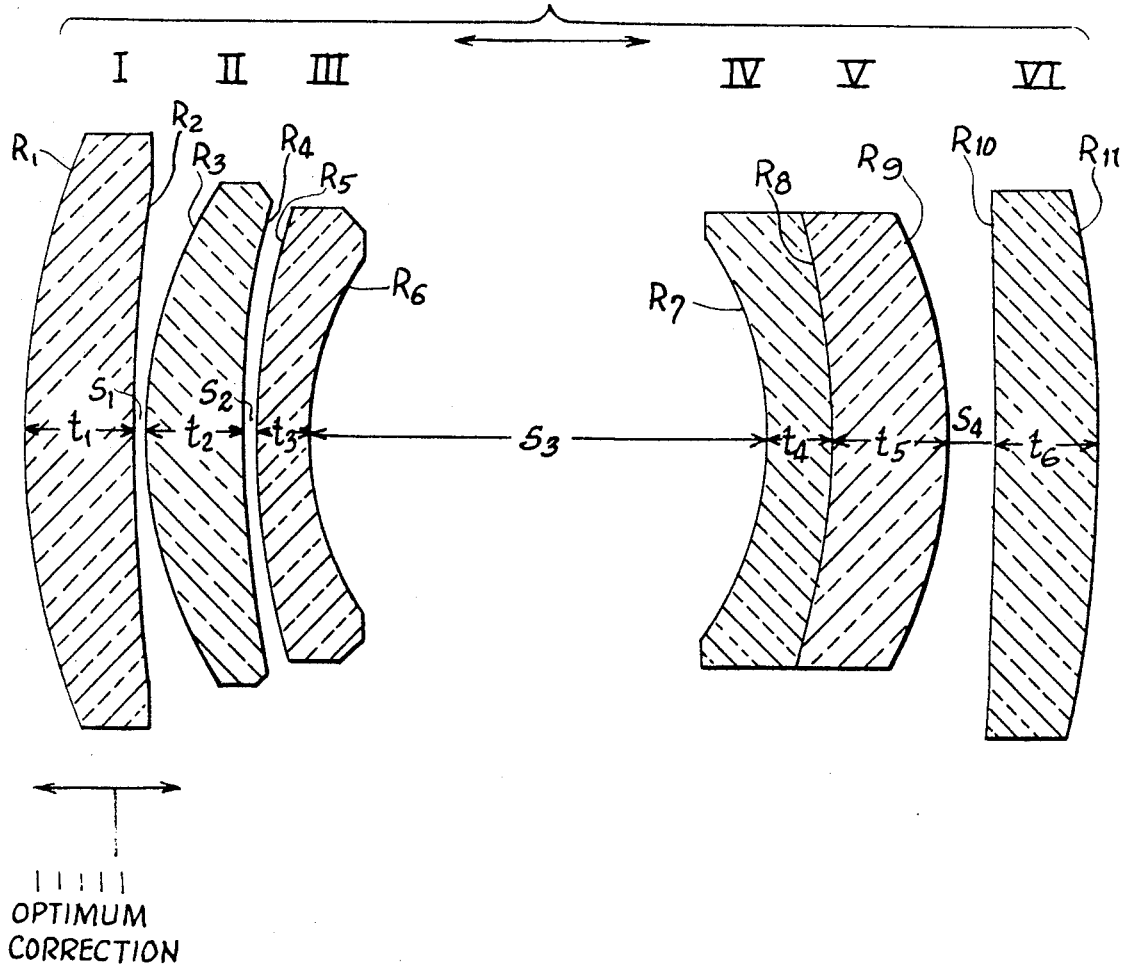

3,517,979
LENS SYSTEM FOR USE IN THE NEAR ULTRAVIOLET LIGHT RANGE
Herman Lowenthal, Chicago, Ill., assignor, by mesne assignments, to R. A. Morgan Co., Inc., Palo Alto, Calif., a corporation of California
Filed June 17, 1968, Ser. No. 737,468
Int. Cl. G02b 13/14, 9/60
U.S. Cl. 350—2                                   2 Claims

ABSTRACT OF THE DISCLOSURE

A lens system for use in the near ultraviolet range has a variable magnification ratio ranging from about 4 to 1 down to 1 to 1. The system is a six element double Gauss type lens system, and is fully corrected. The magnification ratio variation is accomplished by moving the lens system as a whole axially with respect to the image plane. For each magnification ratio, optimum correction is accomplished by changing the separation in air between the first and second lens elements.

BACKGROUND AND SUMMARY OF THE INVENTION

This invention relates to a lens system designed primarily for use in the near ultraviolet region of the light spectrum. The lens system of the invention has a plurality of magnification ratios which may range from about 6 to 1 down to 1 to 1, with a preferred range of 4 to 1 down to 1 to 1.

Lens performance with high resolution for each magnification ratio is obtained by controlling the axial separation between the first and second elements of the lens system which is of the six element double Gauss type.

The lens system embodying the present invention has all lens elements of meniscus shape. In such a system, it has been the practice to have the second and third lens elements in contact with each other and usually cemented. The new lens system embodying the present invention departs from this practice, and provides an air space between the aforesaid second and third lens elements.

A lens system embodying the invention has substantially full correction for spherical aberration, coma, astigmatism, distortion, and curvature of field. By suitable choice of glass for the various elements in the new lens system, longitudinal chromatic aberration is corrected as well as lateral chromatic aberration. The range over which the lens system is designed to operate is from substantially 3,600 to 4,400 AU (angstrom units). The corrections, while highly effective over this range, are theoretically designed for the 4,000 AU figure, the midpoint of the range.

A system embodying the present invention provides good performance over a field of view covering a substnatially 11° full angle for 1 to 1 magnification, Within the fields of view of the indicated angles, resolution away from the lens axis is substantially equal to axial resolution.

For 1 to 1 magnification, by positioning the lens system as a whole at an appropriate location between image and object, the spacing between the first and second lens elements for most desirable lens operation is small. With movement of the entire lens system along the optical axis to increase magnification, the optimum separation between the first and second lens elements is greater. It is understood that specific separations between the first and second lens elements are necessary for maximizing lens system operation at spectific magnifications. The separations between the first and second lens elements hereinafter given correspond to the magnification ratios specified. For intermediate magnification ratios, intermediate lens separation must be established by conventional analysis.

A lens system embodying the invention has a speed of $f./5.6$ at infinity and is free from vignetting, particularly at the preferred magnification ratios of 4 to 1 and 1 to 1.

BRIEF DESCRIPTION OF THE DRAWING

The single figure of the drawing is a diagrammatic view of a lens system embodying the invention, the radii, thicknesses and spacings being denoted by usual conventions.

DESCRIPTION OF THE PREFERRED EMBODIMENT

Referring to the drawing, and beginning with the first or front lens element (upon which incident light falls), lens element I is a meniscus which has an adjustable air space $s_1$ between its rear surface $R_2$ and the opposed front surface $R_3$ of lens element II. The spacing between lens elements I and II may be controlled by conventional means. It is understood that such means should provide predetermined lens separation corresponding to a specific magnification ratio. The magnification ratio is controlled by adjusting the lens system as a whole to predetermined distance from the image (film) plane.

Lens element II is fixed at distance $s_2$ from lens element III. Next along the optical axis is lens element III which is at distance $s_3$ from lens element IV.

The spacing $s_3$ between lens element III and lens element IV can accommodate a diaphragm of conventional construction (not shown).

Lens elements IV, V, and VI are disposed successively along the optical axis. Elements IV and V are in contact with each other while element VI is spaced distance $s_4$ from lens element V.

A shutter (not shown) for controlling exposure may be provided either at the rear of the entire lens system (to the right of lens element VI), or in the space between lens elements III and IV in accordance with usual practice.

In accordance with convention, and beginning with the outside lens surface of lens element I, the successive lens surfaces in the drawing and in the following table have radii of curvature indicated by $R_1$ up to and including $R_{11}$, this being the radius of curvature of the rear outer surface of lens element VI. A positive or plus radius of curvature has the center of curvature to the right of an indicated lens surface, and a negative radius of curvature has the center of curvature to the left of an indicated lens surface.

The thickness of any lens element is indicated by $t$ with a subscript corresponding to the lens element, this thickness being measured along the lens axis, while the axial spacing between opposing surfaces of adjacent lens elements is indicated by $s$ and an appropriate subscript.

The constants defining the glass for each lens element are given in conventional fashion with $N_D$ being the index of refraction referred to the D line (5893 AU) and $v$ being the Abbe number (or constringence).

The lens system is achromatized at P–16 (the peaking spectrum line at 4000 AU).

The lens data for a lens system embodying the present invention having an equivalent focal length (EFL) of 10 and a back focal distance (BFD) of 6.420 is as follows:

| | | | |
|---|---|---|---|
| I | $R_1=+4.092$<br>$t_1=0.570$<br>$R_2=+10.298$<br>$s_{1a}=0.253$<br>$s_{1b}=0.016$<br>$R_3=2.173$ | $N_D=1.517$<br>(4:1 magnification)<br>(1:1 magnification) | $v=64.5$ |
| II | $t_2=0.546$<br>$R_4=+5.440$<br>$s_2=0.082$<br>$R_5=+3.951$ | $N_D=1.517$ | $v=64.5$ |
| III | $t_3=0.272$<br>$R_6=+1.601$<br>$s_3=2.246$<br>$R_7=-1.684$ | $N_D=1.5725$ | $v=42.5$ |
| IV | $t_4=0.349$<br>$R_8=-3.868$ | $N_D=1.5725$ | $v=42.5$ |
| V | $t_5=0.650$<br>$R_9=-2.138$<br>$s_4=0.201$<br>$R_{10}=-44.823$ | $N_D=1.517$ | $v=64.5$ |
| VI | $t_6=0.582$<br>$R_{11}=-5.108$ | $N_D=1.517$ | $v=64.5$ |

The lens aperture, as previously pointed out, has a maximum value of $f/5.6$ at infinity.

The support for the entire lens system (usually a lens barrel) may be movable as a whole over a calibrated scale showing magnification ratios. The spacing adjustment for lens element I must be calibrated in magnification ratio. Thus when the entire lens system is moved for say 4 to 1 magnification ratio, the adjustment for lens element I should be made for the same 4 to 1 magnification ratio, as an example.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

I claim:

1. A lens system for use in the near ultraviolet region characterized by having a magnification range of between about 4 to 1 down or 1 to 1 and having a full angle field of view of from about 18° for maximum magnification down to about 11° for minimum magnification and having an aperture of $f./5.6$ at infinity, said lens system comprising six meniscus type lens elements having the following radii of curvature, index of refraction $N_D$ with reference to the D line and $v$ Abbe number, each lens element having a thickness $t$ along the optical axis with adjacent lens surfaces being separated by distance $s$ along the optical axis, each lens element being indicated in the following table by a Roman numeral beginning from the front end of the lens system for receiving incident light, a positive radius of curvature being measured from a particular lens surface rearwardly along the optical axis and a negative radius of curvature being measured from a particular lens surface forwardly along the optical axis, the total equivalent focal length of the system being 10 units and the back focal distance being 6.420 units:

| | | | |
|---|---|---|---|
| I | $R_1=+4.092$<br>$t_1=0.570$<br>$R_2=+10.298$<br>$s_{1a}=0.253$<br>$s_{1b}=0.016$<br>$R_3=2.173$ | $N_D=1.517$<br>(4:1 magnification)<br>(1:1 magnification) | $v=64.5$ |
| II | $t_2=0.546$<br>$R_4=+5.440$<br>$s_2=0.082$<br>$R_5=+3.951$ | $N_D=1.517$ | $v=64.5$ |
| III | $t_3=0.272$<br>$R_6=+1.601$<br>$s_3=2.246$<br>$R=-1.684$ | $N_D=1.5725$ | $v=42.5$ |
| IV | $t_4=0.349$<br>$R_8=-3.868$ | $N_D=1.5725$ | $v=42.5$ |
| V | $t_5=0.650$<br>$R_9=-2.138$<br>$s_4=0.201$<br>$R_{10}=-44.823$ | $N_D=1.517$ | $v=64.5$ |
| VI | $t_6=0.582$<br>$R_{11}=-5.108$ | $N_D=1.517$ | $v=64.5$ |

2. The lens syhtem according to claim 1 wherein means are provided for mounting lens element I to be movable along the optical axis of the system with reference to lens element II, the change in spacing between the two lens elements being selected to correspond with magnification ratio for maximizing lens system quality for selected magnification ratio.

References Cited

UNITED STATES PATENTS 3,391,968  7/1968  Betensky _____ 350—2

JOHN K. CORBIN, Primary Examiner

U.S. Cl. X.R.

350—218